United States Patent [19]

Courtois et al.

[11] 3,775,060

[45] Nov. 27, 1973

[54] APPARATUS FOR MEASURING THE OXYGEN CONSUMPTION OF A REDUCING ORGANIC MEDIUM

[76] Inventors: Andre Courtois; Yves Lacombe; Jean Laporte; Georges Kovacsik, all of Nimes, France

[22] Filed: Sept. 27, 1971

[21] Appl. No.: 183,928

[52] U.S. Cl. .................. 23/253 R, 195/103.5 R
[51] Int. Cl. .................. G01n 33/16, G01n 33/18
[58] Field of Search ............. 23/230 B, 230 R, 23/230 PC, 232 C, 253, 254; 195/103.5

[56] References Cited
UNITED STATES PATENTS
3,282,803  11/1966  Poepel et al. ............. 23/230 R X Primary Examiner—Robert M. Reese
Attorney—John R. Janes et al.

[57] ABSTRACT

Apparatus for the automatic and continuous measurement of the course of the consumption of oxygen, also called the biochemical oxygen demand, of a sample of a reducing organic medium, at a substantially constant oxygen pressure. One of the applications of this apparatus is the study of the biochemical oxygen demand of water polluted by effluents.

6 Claims, 1 Drawing Figure

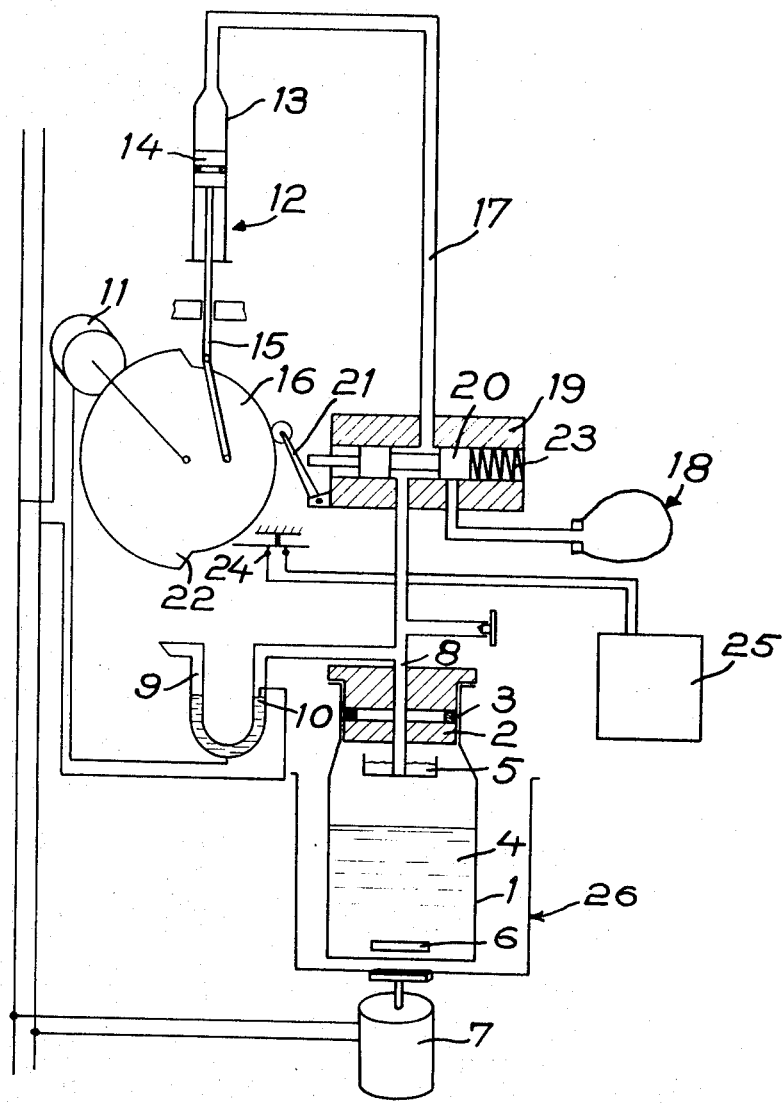

APPARATUS FOR MEASURING THE OXYGEN CONSUMPTION OF A REDUCING ORGANIC MEDIUM

The present invention relates to apparatus for measuring continuously the oxygen consumption of a reducing organic medium during a period that may vary from several hours to several days.

It is an object of the invention to provide apparatus which allows the total quantity of oxygen consumed during a specific period by living micro-organisms contained in a given medium, in particular in polluted waters, to be measured and recorded. A further object of the invention is to allow the course of the oxygen consumption in the course of the period to be followed and, furthermore, to allow this consumption to be studied while preserving a constant partial oxygen pressure in the atmosphere above the medium.

It is known that the measurement of the biochemical oxygen demand, currently designated by the initials B.O.D., consists in determining the quantity of oxygen consumed, during a specific period by a given medium, for example by a liquid, or a soil containing living micro-organisms. These micro-organisms are aerobic bacteria which transform the biodegradable organic matters contained in the medium by consuming oxygen. The measurement of the consumption of oxygen therefore allows a medium, water or soil, its evolution and its aptitude for self-purification, to be indirectly studied.

The most important and the most current application of the measurement of the B.O.D. is the study of the pollution of water by effluents. The degree of pollution is determined by effecting a measurement of the B.O.D. for a period of 5 days.

The techniques used to date for measuring the B.O.D. have certain disadvantages and do not allow automatic recording.

Techniques employing dilution call for numerous dilutions and the natural conditions of oxidation of the organic media are not taken into account, the quantity of oxygen present in the confined medium diminishing in the course of the measurement.

Techniques employing pressure reduction of depression, in which the partial reduction in pressure, or depression, in a sealed enclosure due to the absorption of oxygen is evaluated, entail a modification of the natural conditions.

In fact, the composition of the atmosphere in contact with the medium studied varies, the partial oxygen pressure diminishing in the course of the measurement and the total pressure diminishing also.

In order to remedy the pressure decrease, another technique, employing variation of volume is used, which allows the pressure to be re-established by progressively reducing the volume. In this case, the decrease in volume, which corresponds to the quantity of oxygen consumed, is measured. However, this technique does not obviate the variations in composition of the atmosphere in which the proportion of oxygen is diminishing.

This technique necessitates the use of micrometric screws and allows only very small variations in volume to be compensated. It is applied to the measurement of the consumption of oxygen by cultures of bacteria in a nutritive medium of reduced volume. It has not been applied to the measurement of the consumption of oxygen by a reducing organic medium in which the bacteria play the part of a biological means of oxidation.

There is also known a device which allows the course of the oxygen consumption as well as the integrated consumption during a period to be measured. This device is fed by an electolytic cell. The intensity of the electrolytic current is a function of the pressure of the sealed enclosure containing the sample. It is this intensity which is measured.

In accordance with the present invention, a reservoir of oxygen is used which has a constant pressure and between this receptacle and the cell there is interposed a dosing apparatus which feeds the cell with oxygen, and an apparatus recording in continuous manner, as a function of time, the doses of oxygen injected.

The apparatus in accordance with the invention comprises a container incapable of passing actinic light and closed by a tight stopper arranged to receive a sample of the medium whose B.O.D. is desired to be known. A carbonic gas trap is arranged inside the said container and means are provided for injecting progressively, into the said container, oxygen contained in a reservoir under constant pressure, in order to re-establish the initial pressure.

The apparatus further comprises means for measuring the volume of oxygen injected into the container, this measurement corresponding to the biochemical oxygen demand during the period in question.

The apparatus may also be provided with a differential gauge connected to the interior of the said container, provided with a contact which is connected in the feed circuit of a motor driving a pump which applies suction to the oxygen reservoir and which discharges into the said container.

The pump may be a dosing pump and the apparatus may include a contact actuated by a cam keyed to the driving shaft of the pump, which contact delivers one pulse during each pump revolution. These pulses can be recorded graphically or counted by a pulse counter. This recording allows the evolution of the B.O.D. to be evaluated during the course of the measuring period.

In one advantageous embodiment, the dosing pump is constituted by an automatic syringe driven by a motor which also drives a cam acting on the distributing slide of a three-way valve, one way communicating with the syringe, a second communicating with the oxygen reservoir, and the third with the container incapable of passing actinic light. The dosing pump may also be constituted by a peristaltic pump, that is to say a pump constituted by one or more rollers which squeeze a flexible tube. The oxygen reservoir is preferably constituted by a deformable envelope.

The results and advantages of apparatus according to the invention are as follows:

The fact of re-injecting oxygen in order to re-establish continually the initial pressure allows measurements to be taken without substantially modifying the conditions of total pressure and of partial pressure of oxygen in which the medium being studied is placed.

A tape travelling at a constant speed may be used to register the successive injections of oxygen and this allows the susccessive values of the B.O.D. and the course with time of the biochemical oxygen demand to be known automatically during a measuring period.

This latter result consequentially gives rise to numerous supplementary indications concerning this evolution and constitutes a result not hither to available, since the previously-known systems did not allow this evolution to become known. It explains in fact numerous anomalies and discrepancies which have been detected during the observations hitherto carried out. It also allows the activity of the bacteria to be appreciated during the period of latency due to the adaptation of the germs to the medium, and the lack of activity which is due to a defect in seeding. It also allows the disturbances in the consumption of oxygen due to the precocious activity of the nitrating bacteria to be verified. It permits also a determination of any changes in biochemical oxygen demand as the result of intensive microbiological activity, or of temperatures differing from the usual 20°C measuring temperature.

Another advantage of the invention resides in the fact that the pulses which correspond to the injection of each single dose of oxygen can be recorded numerically and the numerical values can enter into information processing units such as a calculator or computer in order to be stored or in order to be used in calculations. For example, it will be possible to establish automatically, from these data, curves showing the course of the consumption of oxygen, the calculations of the corrections due to the seeding, numerical comparisons between samples, etc.

In order that the invention may be more clearly understood, reference will now be made to the accompanying drawing which shows one embodiment thereof, in schematic fashion and by way of example.

Referring to the drawing, there is shown a container 1 which consists of a bottle incapable of passing actinic light and sealed by a stopper 2 provided with a joint 3, such as an O-ring. This bottle is immersed in a bath 26 whose temperature is kept constant, generally at 20°C, by a water-cooling system or a Peltier effect system for reduction of temperature and by an electrical heating system for increasing it, the whole being monitored by a thermostat. Into this bottle 1 there is placed a sample 4 of liquid whose B.O.D. it is desired to study. The liquid 4 occupies only a portion of the bottle which is topped up by air at atmospheric pressure.

A chemical carbon dioxide gas trap 5 is placed inside the container 1. This trap is constituted, for example, by a trough containing a concentrated solution of soda or of potash. A magnetic agitator 6 driven by an electric motor 7 is also arranged in the container 1, and a tube 8 passes into the bottle 1 through the stopper 2. Onto a branch of this tube there is connected a differential gauge 9 provided with a contact 10. This contact 10 is wired in series in the feed circuit of a motor 11 which drives a dosing pump. The reference pressure is either the atmosphere or a closed receptacle. The dosing pump shown is constituted by an automatic syringe 12 comprising a cylinder 13 and a piston 14 which is reciprocated therewithin by a connecting rod and crank system 15 articulated on a disc 16 rotated by the motor 11.

The syringe 12 communicates through a tube 17 with an oxygen reservoir 18. This reservoir is constituted by a deformable envelope so that the oxygen contained in the reservoir is always at atmospheric pressure.

The syringe 12 also communicates with the tube 8 which leads into the bottle 1. The communications between the syringe, the oxygen reservoir and the container 1 are controlled by a three-way valve 19 having a distributing slide 20 which is operated by a hinged lever 21 actuated by a cam 22 mounted on the disc 16.

A spring 23 exerts on the distributor 20 an action in opposition to that of the lever 21. When the lever 21 is not pushed back by the cam, the spring 23 places the distributor into the position shown in the Figure where the syringe communicates with the bottle. This represents the delivery time of the syringe.

On the other hand, during the time that the cam 22 passes in front of the lever, the slide 20 of the distributor is pushed back and the syringe is in communication with the oxygen reservoir 18. During this same period, the piston 14 moves from top to bottom of the syringe. This represents the suction time of the pump. The volume or oxygen sucked in and delivered into the bottle during each pump revolution is a constant volume at constant pressure corresponding to the volume swept by the travel of the piston 14.

By way of example, the bottle may have a volume of 500 ml, the useful volume of the syringe may have a volume of 1 ml, and the contact of the pressure gauge may be arranged to close when the depression reaches 2 millibars so that the syringe can reestablish the pressure in one stroke. However, by increasing the sensitivity of the differential pressure gauge, the syringe may be arranged to function in steps in such manner that it reestablishes the pressure with minimum discontinuities.

The slide valve 19 may be replaced by spring-loaded suction and delivery valves. The advantage of using a valve of the kind shown at 19, however, is that errors due to the calibration of the springs of conventional valves are avoided.

The apparatus also includes a contact 24 which is actuated by the cam 22 during each revolution of the disc 16 during which time it delivers one pulse. These pulses can be recorded in the form of points inscribed on a recording tape 25 which is caused to travel at a constant speed. The study of the curve formed by these dots supplies information on the evolution of the demand for oxygen during the measurement.

The pulses may alternatively be recorded on a counter so that they may be fed into the store of a computer or other calculator which will be able to use them to effect various processing operations of these bits of information.

Several measuring apparatus may be fed by the same oxygen reservoir and connected to a common multi-way recorder.

We claim:
1. Apparatus for the automatic and continuous measurement of the course of the consumption of oxygen of a sample of a reducing organic medium, said apparatus comprising:
   a sealed enclosure for receiving said sample;
   a carbon-dioxide gas trap located within said enclosure;
   a deformable envelope constituting an oxygen reservoir at constant pressure connected to said enclosure; and
   means for injecting into said enclosure oxygen taken from said reservoir in order to keep the pressure inside said enclosure constant and to record in a continuous manner, as a function of time, the quantities of oxygen injected.
2. Apparatus according to claim 1, wherein said enclosure is located within a thermostatically controlled enclosure and has walls incapable of passing actinic light.

3. Apparatus according to claim 1, comprising a differential pressure gauge having an electrical contact and connected to said enclosure, a dosing pump arranged to apply suction to said oxygen reservoir and to deliver the oxygen into said enclosure, said pressure gauge having a contact wired in an electrical circuit for feeding a driving motor for said dosing pump.

4. Apparatus according to claim 3, wherein said dosing pump is constituted by an automatic syringe driven by eccentric means, a cam being mounted on said eccentric means to act on the slide of a slide valve having three ways, the first of which communicates with said syringe, the second of which communicates with said oxygen reservoir, and the third of which communicates with said enclosure containing said sample.

5. Apparatus according to claim 3, whrein said dosing pump includes a contact, actuated by a cam during each cycle of said pump, and means for graphically recording pulses corresponding to the opeations of said contact on a record carrier which is moved at a constant speed.

6. Apparatus according to claim 5, further comprising a counter for recording said pulses corresponding to the operations of said contact.

* * * * *